United States Patent [19]

Ikuta

[11] Patent Number: 5,570,852
[45] Date of Patent: Nov. 5, 1996

[54] GEAR MECHANISM AND TAPE PLAYER USING GEAR MECHANISM

[76] Inventor: Tadahiro Ikuta, 1276-2 Modori, Nishinasuno-machi Nasu-gun, Tochigi, Japan

[21] Appl. No.: 203,051

[22] Filed: Feb. 28, 1994

[30] Foreign Application Priority Data

Mar. 2, 1993 [JP] Japan .................. 5-041118

[51] Int. Cl.$^6$ .................................. G11B 15/44
[52] U.S. Cl. .................................. 242/356
[58] Field of Search .................. 242/356, 356.3, 242/356.4, 356.5, 356.7; 360/96.3; 74/384, 462

[56] References Cited

U.S. PATENT DOCUMENTS

| | | | |
|---|---|---|---|
| 4,139,167 | 2/1979 | Osanai | 242/356.4 |
| 4,149,202 | 4/1979 | Terada et al. | 242/355.1 |
| 4,223,528 | 9/1980 | Vuilleumier | 74/462 |
| 4,760,751 | 8/1988 | Kasamatsu | 242/356 |
| 4,912,998 | 4/1990 | Sugano et al. | 74/462 |
| 5,031,471 | 7/1991 | Watanabe | 74/384 |
| 5,140,475 | 8/1992 | Tanaka | 242/355.1 |
| 5,295,638 | 3/1994 | Lee | 242/356 |
| 5,335,877 | 8/1994 | Sawai et al. | 242/356 |

FOREIGN PATENT DOCUMENTS

| | | | |
|---|---|---|---|
| 55-112455 | 8/1980 | Japan | 74/462 |
| 4-366450 | 12/1992 | Japan | 242/356 |

*Primary Examiner*—John P. Darling
*Attorney, Agent, or Firm*—Joseph C. Mason, Jr.; Ronald E. Smith

[57] ABSTRACT

Preselected teeth of a gear tooth are truncated by removing their radially outermost ends. Thus, whenever teeth that should mesh become misaligned, the truncation allows the teeth to quickly return to their proper meshing. This reduces the sound generated by nonmeshing teeth. In a tape player using gears having preselected truncated teeth, an idler arm carries an idler gear at its free end and is pivotal into first, neutral, and second positions. At low speed operation, when a cassette is in the player, a pair of driving gears are not intermeshed, and the first position of the idler gear causes recording or playing back and the second position causes rewinding. At high speed operation, when no cassette is in the tape player, the driving gears are intermeshed, and the first and second positions of the idler arm cause fast forwarding and rewinding, respectively.

5 Claims, 10 Drawing Sheets

GEAR MECHANISM AND TAPE PLAYER USING GEAR MECHANISM

BACKGROUND OF THE INVENTION

1. Field of the Invention

The present invention relates to a gear mechanism having a movable gear which is so disposed as to able to engage with and separate from a fixed-shaft gear which rotates at a fixed position. The present invention also relates to a tape player having a gear mechanism which moves an idler gear to drive a reel block gear and/or switch directions of the tape feed.

2. Description of the Prior Art

A conventional tape player typically comprises a pair of driving gears and a pair of reel block gears and an idler gear which moves between one position so as to engage with one each of the driving gears and the reel block gears and another position so as to engage with the other driving gear and the reel block gear so that disposition of the idler gear shifts directions of the tape feed.

As shown in FIG. 9, when a movable gear (an idler gear 2 as shown in the attached drawings) of a conventional gear mechanism approaches to engage with a reel block gear 1 and a fixed-shaft gear which rotates at a fixed position to serve as a driving gear, it sometimes happens that a tooth tip 1a of the driving gear or reel block gear 1 abuts against tooth tip 2a of idler gear 2 as shown in FIG. 10, working pressure of both gears acting towards their respective centers. Then, subsequent tooth tips 1b and 2b abut against each other, working pressure of both gears again acting towards the respective centers, and tooth tips 1c and 2c will thereafter abut against each other in the same manner. Thus the gears fail to engage in the normal manner shown in FIG. 9 and consequently produce noise and/or malfunctions.

In order to solve the above problem, an object of the present invention is to provide a gear mechanism of a simple structure which places only minimal limitations on the design criteria and minimizes the occurrence of noise and/or malfunction by means of reducing abutment of tooth tips when gears are interlocked and, even should such abutment occur, permits the gears to be engaged in the normal manner immediately thereafter.

SUMMARY OF THE INVENTION

The gear mechanism of the present invention fixed-shaft gear rotated at a fixed position and a movable gear which is movable to and away from the fixed-shaft gear so as to be freely engaged with and separated therefrom, wherein the portion from the root circle to the tip circle of each tooth of the fixed-shaft gear and the movable gear is formed of a constant curvature; and either the fixed-shaft gear or the movable gear or both are provided with truncated teeth intermittently placed with full-size teeth, each truncated tooth having its tip portion from the vicinity of the pitch circle to the tip circle cut off.

The tape player of the present invention has idler gears which are movable to and away from driving gears and reel block gears so as to freely gage with and separate from said driving gears and reel block gears, the reel block gears being driven through shifting engagement of the idler gears, wherein the portion from the root circle to the tip circle of each tooth of the driving gears, reel block gears and idler gears is formed of a constant curvature; and at least one of the driving gears or the reel block gears or the idler gears is provided with truncated teeth intermittently placed with full-size teeth, each truncated tooth having its tip portion from the vicinity of the pitch circle to the tip circle cut off.

The tape player of the p resent invention further includes a driving gear and a pair of reel block gears. An intermediate gear having a fixed shaft is provided between the driving gear and at least one of the reel block gears so as to be able to engage with said reel block gear; an idler gear is provided between the intermediate gear and the driving gear so as to be able to engage with them; and directions of the tape feed is switched through shifting engagement of the idler gear.

In the configuration of a gear mechanism according to a first embodiment of the present invention, a movable gear approaches a fixed-shaft gear and becomes engaged therewith so that rotation is transmitted from, for example, the fixed-shaft gear to the movable gear. During the approaching process of the movable gear to the fixed-shaft gear, should tips of teeth of the gears abut against each other, rotation of the fixed-shaft gear is transmitted to the movable gear and the gears thus rotate with their tooth tips being in contact with each other. When rotation of the gears moves a truncated tooth, of which a portion from the vicinity of the pitch circle to the tip circle is cut off, to the engaging position, opposing teeth of the gears do not come into contact, and, therefore, pressing force of the engaged teeth works in the direction of rotation of the respective gears and the engaged teeth are consequently released from abutment, returning the condition of the gears to normal engagement.

In the configuration of a tape player according to the present invention, when an idler gear is moved in a first direction it becomes engaged with a driving gear and a reel block gear so that rotation of the driving gear is transmitted through the idler gear to the reel block gear. At that time, should tips of teeth of the idler gear and the driving gear or those of the idler gear and the reel block gear abut against each other, the gears rotate in close contact with each other, with their tooth tips being in abutment with each other. When rotation of the gears moves a truncated tooth, of which a portion from the vicinity of the pitch circle to the tip circle is cut off, to the engaging position, opposing teeth of the gears do not come into contact, and, therefore, pressing force of the engaged teeth works in the direction of rotation of the respective gears and the engaged teeth are consequently released from abutment, returning the condition of the gears to normal engagement.

When the idler gear is moved in the opposite direction, it is separated from engagement with the driving gear and the reel block gear.

In the configuration of the tape player of the present invention, when an idler gear is moved in a first direction it becomes engaged with a driving gear and a reel block gear so that rotation of the driving gear is transmitted through the idler gear to the reel block gear, which consequently takes up a recording tape in the forward direction at a low speed or a high speed.

When the idler gear is moved in the opposite direction, it is separated from engagement the said reel block gear and becomes engaged with the driving gear and a fixed-shaft intermediate gear. Through said intermediate gear, the driving gear becomes engaged with the other reel block gear, thus permitting the recording tape to be taken up in the rewind direction at a low speed or a high speed by the other reel block.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

Figure 1:
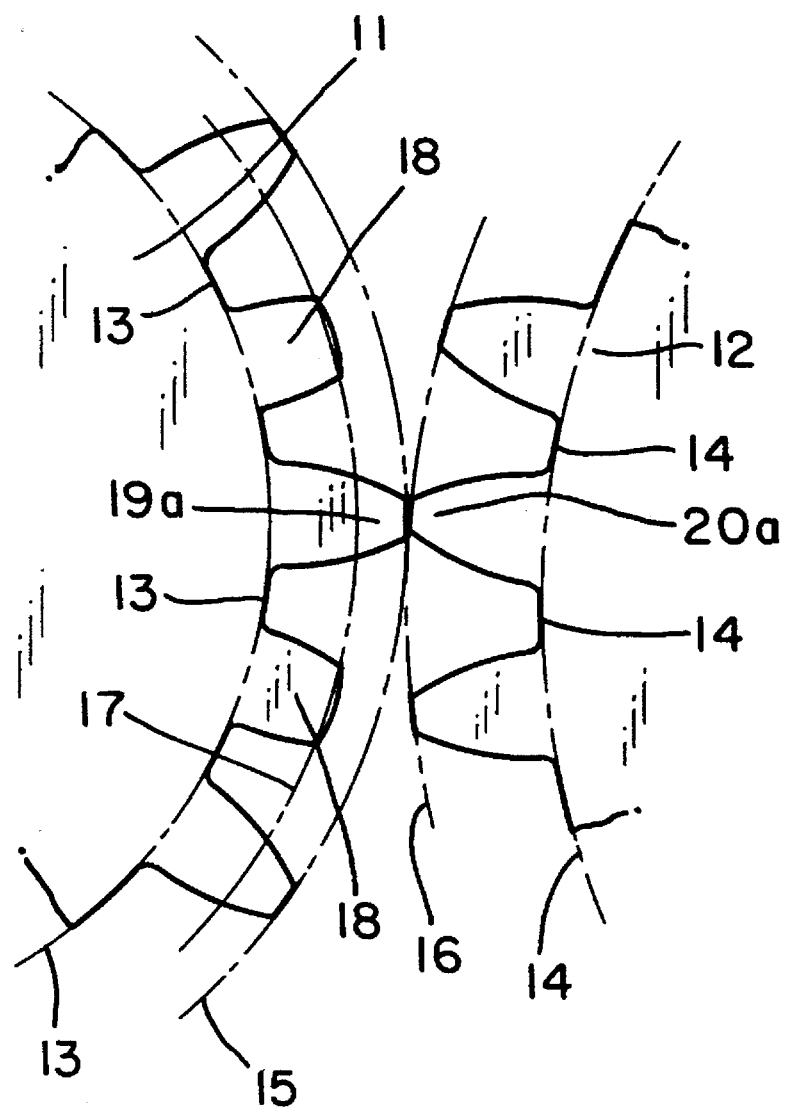
FIG. 1 is a plan view of a part of a gear mechanism according to an embodiment of the present invention.

An embodiment of a gear mechanism according to the present invention is explained hereunder, referring to FIG. 1.

In FIG. 1, numeral 11 denotes a fixed-shaft gear rotated around a shaft at a fixed position. Numeral 12 denotes a movable gear which is capable of moving toward and away from fixed-shaft gear 11 to be engaged therewith or separated therefrom, respectively. Movable gear 12 rotates around a shaft which is rotatably supported at, for example, an eccentric position of a rotary arm pivotably supported by a shaft which is not shown in the drawings.

Fixed-shaft gear 11 and movable gear 12 are formed in such a manner that the portion from a root circle 13 to a tip circle 15 of fixed-shaft gear 11 and the portion from a root circle 14 to a tip circle 16 of movable gear 12 are formed of a constant curvature. Fixed-shaft gear 11 is provided with truncated teeth 18 alternately placed with full-size teeth, each truncated tooth 18 having its tip portion from the vicinity of pitch circle 17 to tip circle 15 cut off, i.e., the radially outermost end of such tooth is cut off or the tooth is originally manufactured without such radially outermost end.

Next, the function of the present embodiment is explained hereunder.

Figure 2:
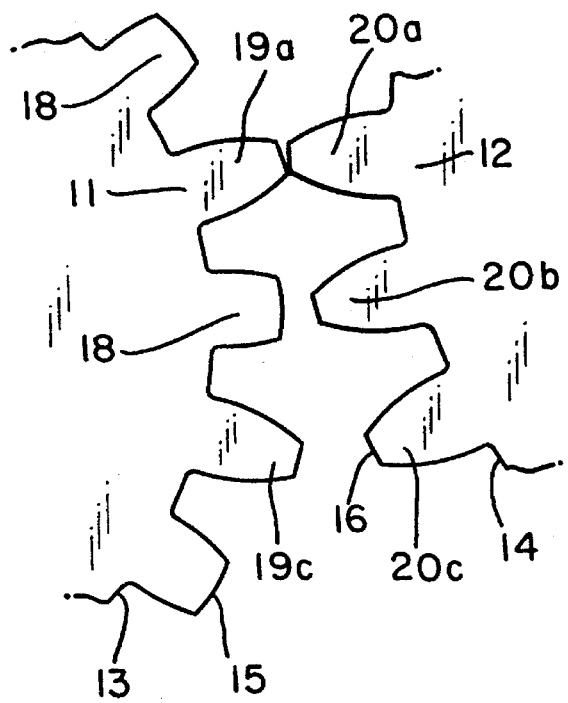
FIG. 2 is a plan view showing gear shifting action of said embodiment.
Figure 3:
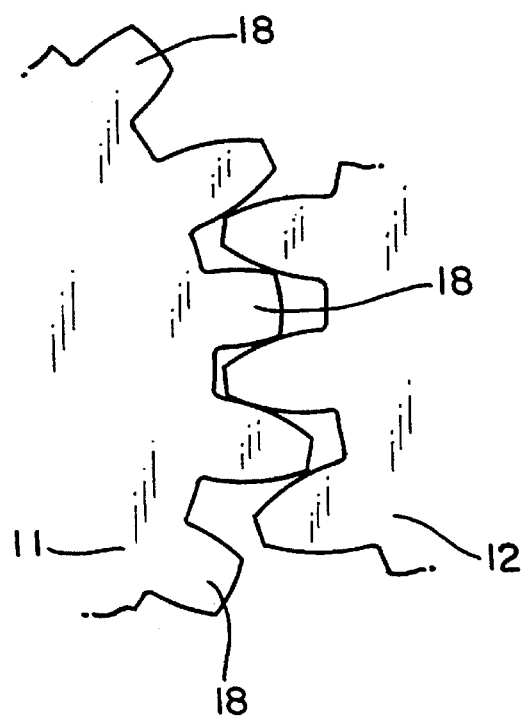
FIG. 3 is a plan view showing the engaged state of said embodiment.

As shown in FIGS. 1–3, movable gear 12 approaches fixed-shaft gear 11 and becomes engaged therewith so that rotation is transmitted from, for example, fixed-shaft gear 11 to movable gear 12. During the approaching process of movable gear 12 to fixed-shaft gear 11, should tip circle portions 15/16 of teeth portions 19a/20a abut against each other as shown in FIG. 1, rotation of fixed-shaft gear 11 is transmitted to movable gear 12 with their tip circle portions 15/16 being in contact with each other, and the gears rotate in their respective directions respectively. When rotation of gears 11/12 (Fig . 2) moves truncated tooth 18 of fixed-shaft gear 11, of which a portion from the vicinity of pitch circle 17 to the tip circle cut is off, to the engaging position, opposing teeth 18/20b do not come in contact, and, therefore, pressing force of teeth 19a/20a works in the direction of rotation of the respective gears 11/12. Teeth 19a/20a are thus released from their abutment as depicted in FIG. 3. Because of truncated tooth 18 with its tip portion from tip circle 15 to the vicinity of pitch circle 17 cut off, space between teeth of fixed-shaft gear 11 is in actuality enlarged to the distance between teeth 19a and 19c, and that of movable gear is also in actuality enlarged to the distance between teeth 20a and 20c, permitting smooth, normal engagement.

Figure 4:
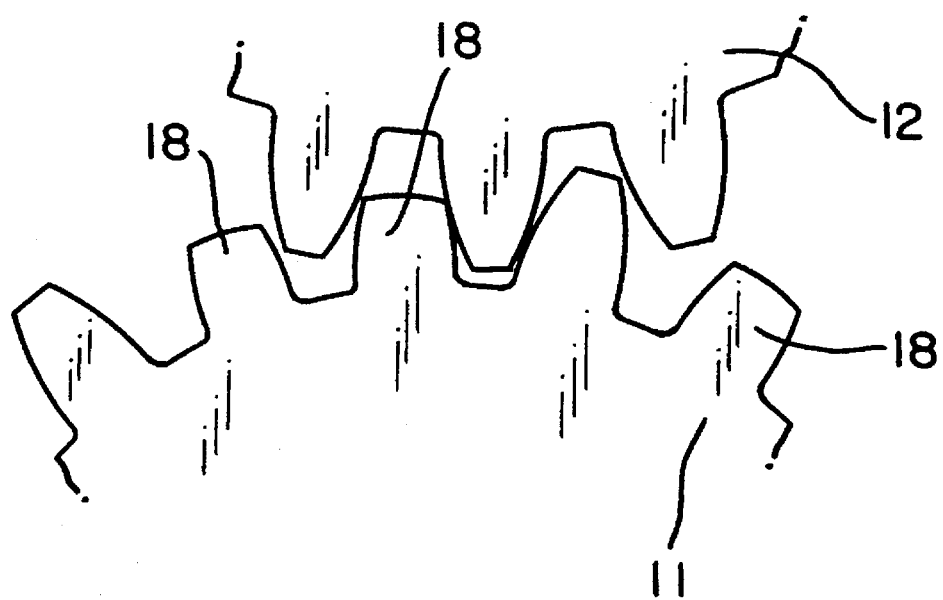
FIG. 4 is a plan view of a part of a gear mechanism according to another embodiment of the present invention.

Although truncated tooth 18, of which a portion from the vicinity of pitch circle 17 to tip circle 15 is cut off, is provided alternately with each uncut tooth in the configuration of the present embodiment, truncated teeth may be disposed in various intermittent manners without departing from the scope or spirit of the invention as defined in the append ed claims. An example of such alternative configuration is shown in FIG. 4, wherein truncated teeth 18, of which front end portions from tip circle 15 to the vicinity of pitch circle 17 are cut off, are provided at desired positions.

Furthermore, according to the present invention, truncated teeth 18 having their tip portions from the vicinity of pitch circle 17 to tip circle 15 cut off a reformed only on fixed-shaft gear 11. However, such truncated teeth 18 may be formed on movable gear 12 instead of fixed-shaft gear 11 or on both as depicted in FIG. 4.

Figure 5:
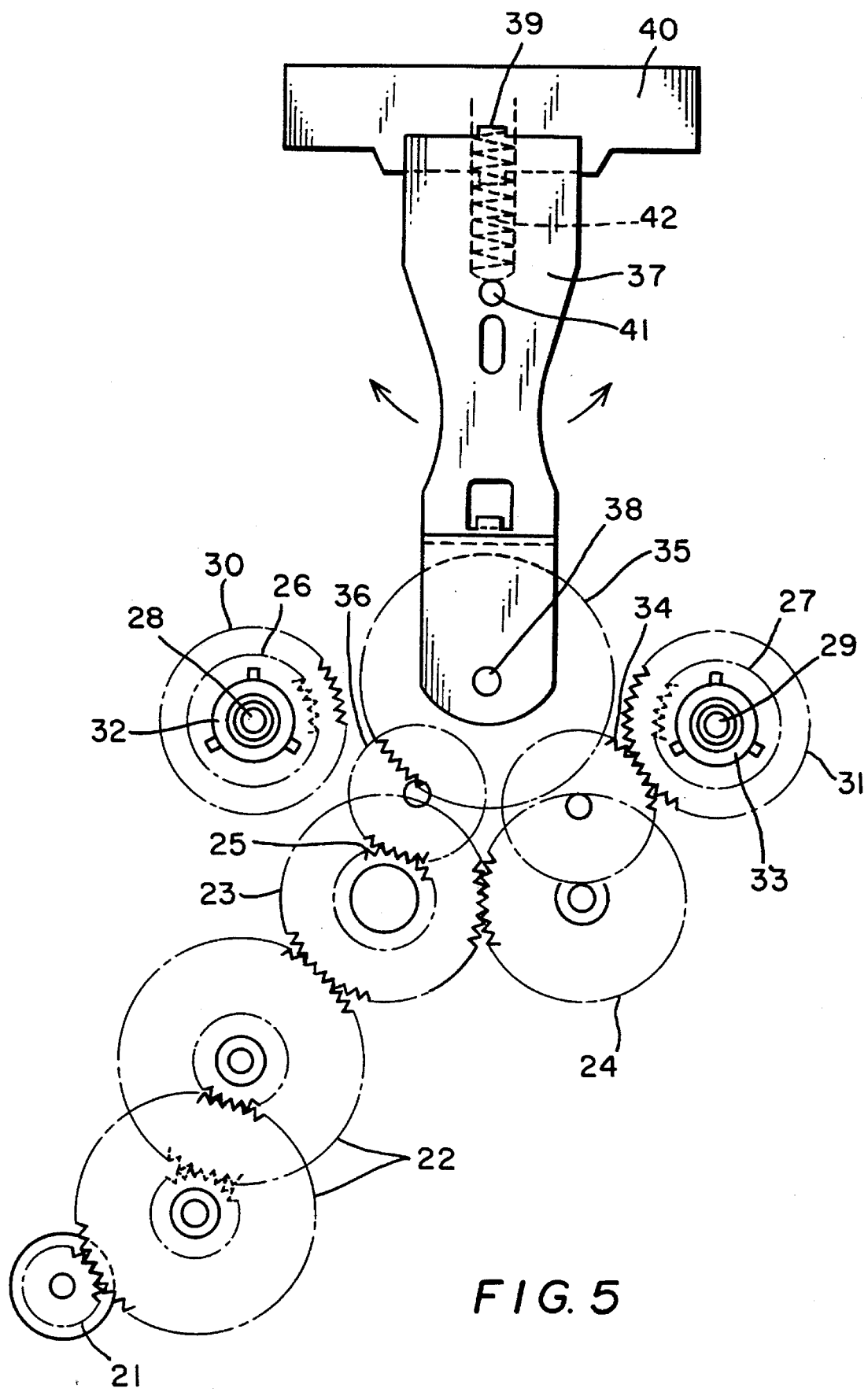
FIG. 5 is a plan view of a gear mechanism of a tape player according to an embodiment of the present invention.

Next, an embodiment of a tape player according to the present invention is explained hereunder, referring to FIG. 5.

Numeral 21 denotes an output gear of an electric motor. Output gear 21 is attached to a base plate (not shown) by means of a shaft and engaged with a reduction gear mechanism 22. A first driving gear 23 attached to a base plate by means of a shaft is engaged with the output end of reduction gear mechanism 22, and a second driving gear 24, which is movably attached in parallel with first driving gear 23 to the base plate by means of a movable shaft, is constantly engaged with first driving gear 23 when a tape is running at high speed. Also provided is a third driving gear 25, which is smaller in diameter than first driving gear 23 and rotates coaxially and in conjunction therewith. When a tape runs at a low speed, second driving gear 24 is moved in such a direction as to be separated from first driving gear 23 by a head mounting plate which is provided as to be slidable on the base plate.

Numerals 26/27 denote a pair of fixed-shaft gears which respectively correspond to first and second driving gears 23/24 and are rotatably mounted on the base plate by means of shafts 28/29. Fixed-shaft gears 26/27 serve as small reel block gears and rotate paired together with large reel block gears 30/31 which are of a larger diameter and share their respective shafts with the small reel block gears. Through friction engagement, small reel block gears 26/27 respectively rotate reel blocks 32/33 which are rotatably supported by said shafts 28/29. An intermediate gear 34 having a fixed shaft is disposed as to engage with large reel block 31.

In the same manner as gears 11/12 shown in FIG. 1, driving gears 23 /24, reel block gears 26/27/30/31 and fixed-shaft intermediate gear 34 are formed in such a manner that the portion from the root circle to the tip circle of each tooth thereof is formed of a constant curvature.

Numeral 35 and 36 denote movable idler gears with different diameters, their respective portions from the root circle to the tip circle of each tooth being formed of a constant curvature, in the same manner as gears 11/12 shown in FIG. 1. Like fixed-shaft gear 11 shown in FIG. 1, idler gears 35/36 are provided with truncated teeth alternately placed with full-size teeth, each truncated tooth having its tip portion from the vicinity of the pitch circle to the tip circle cut off.

Idler gear 35, the diameter of which is the larger of the two idle gears, is rotatably attached by means of a shaft 38 the front end of an idler arm 37. Idler arm 37 is attached to the base plate so as to be capable of a swinging motion.

Figure 6:
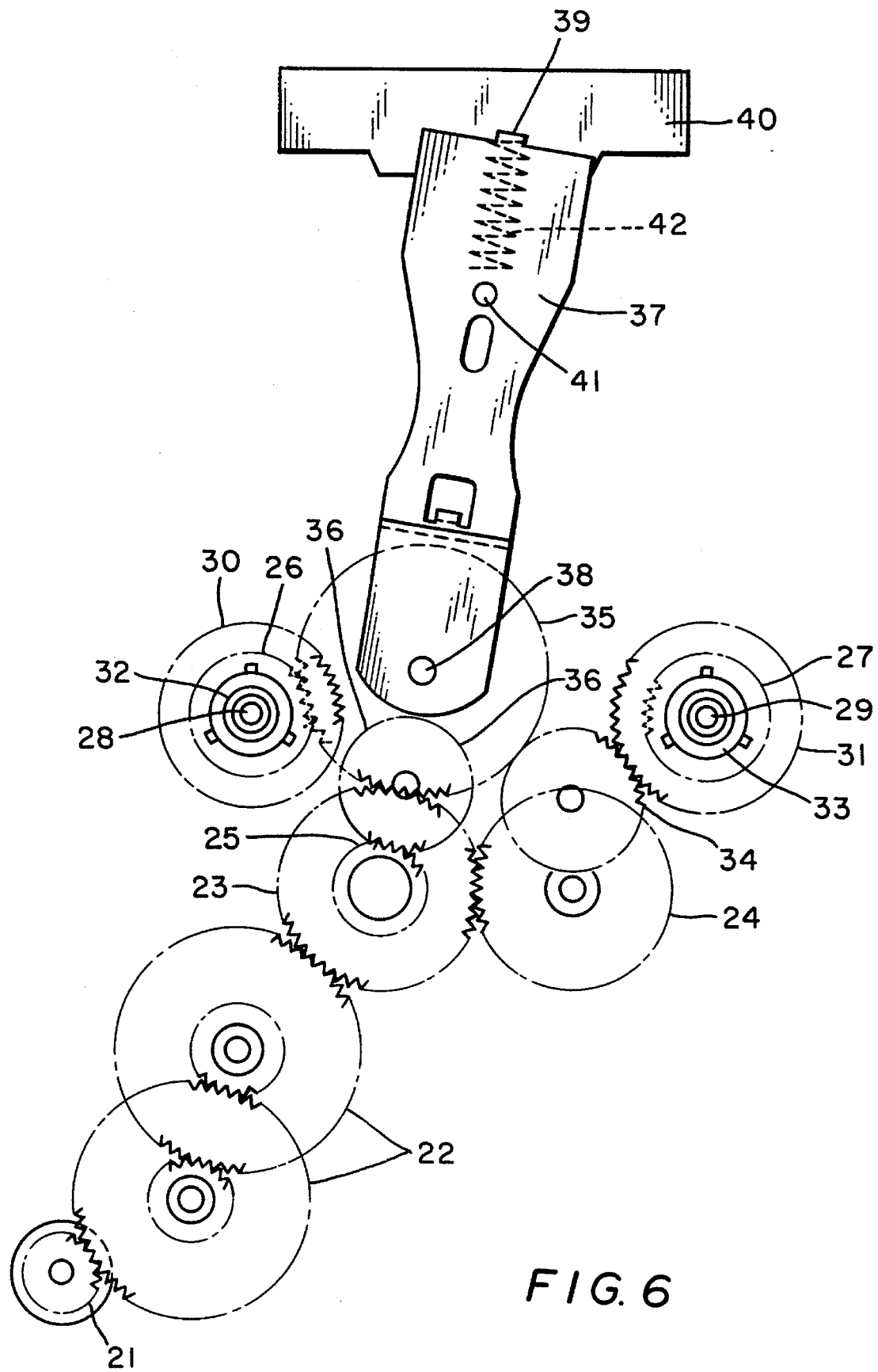
FIGS. 6 and 6A are plan views showing the engaged state of the FIG. 5 embodiment during high-speed tape feeding.
Figure 6A:
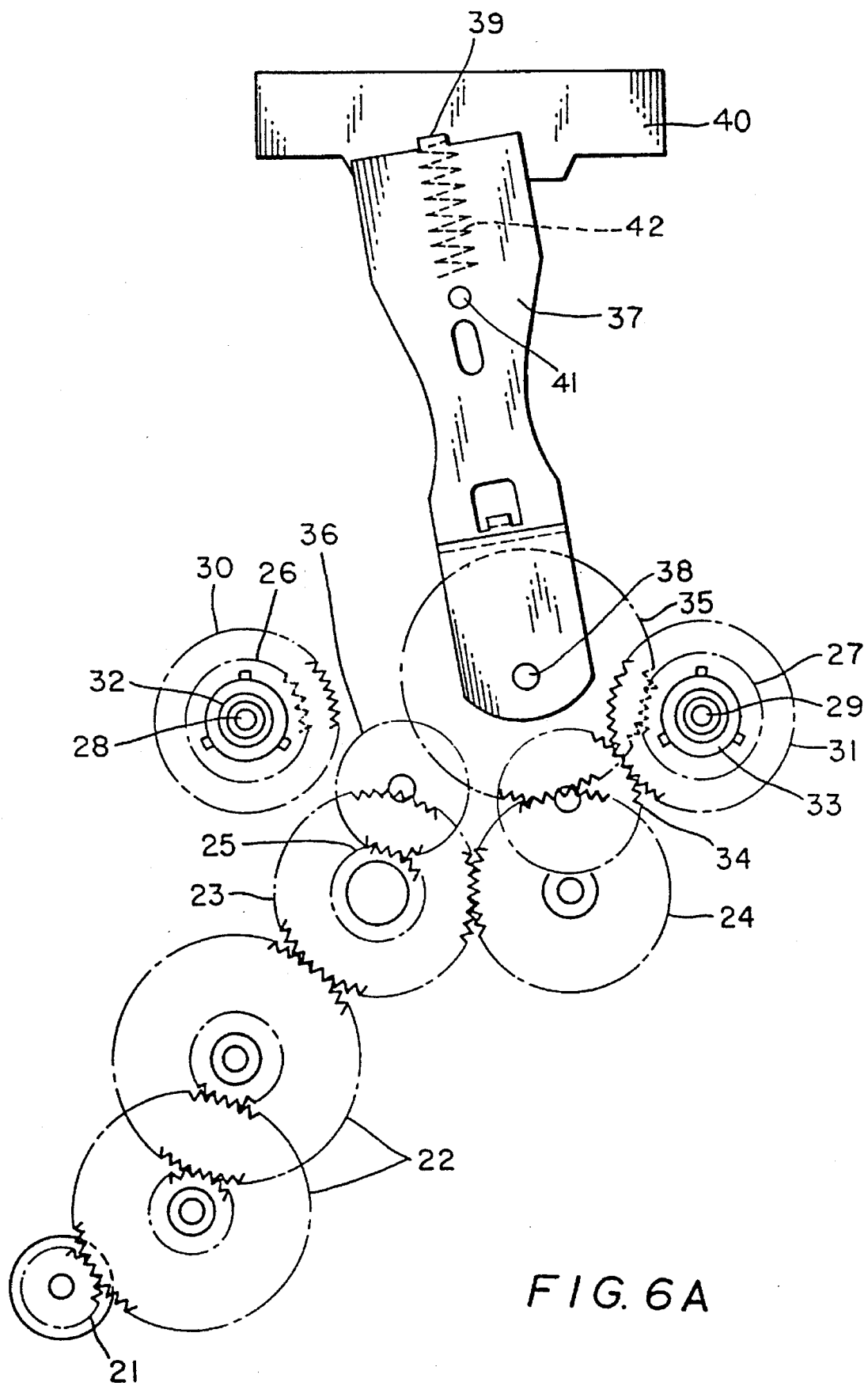

With the configuration as above, when a tape is fed at a high speed, swinging action of idler arm 37 moves large idler gear 35 so that large idler gear 35 engages either with the combination of first driving gear 23 and small reel block gear 26 (as depicted in FIG. 6) or with the combination of second driving gear 24 and the other small reel block gear 27(as depicted in FIG. 6A). At that time, second driving gear 24 is engaged with first driving gear 23.

When a tape is fed at a low speed, the other idler gear, i.e. small idler gear 36, works in conjunction with a low-speed feed switching mechanism (not shown) as to engage either with the combination of third driving gear 25 and large reel block gear 30 or with the combination of third driving gear 25 and fixed-shaft intermediate gear 34.

A raised portion 39 is formed at the base end of idler arm 37 and is engaged with a switching plate 40, which slides laterally through operation of a fast-forward/rewinding operation lever (not shown). A spring 42 is stretched between a supporting shaft 41 mounted on switching plate 40 and raised portion 39 so that sliding motion of switching plate 40 causes pivotal movement of idler arm 37, with raised portion 39 serving as the point of application.

Figure 7:
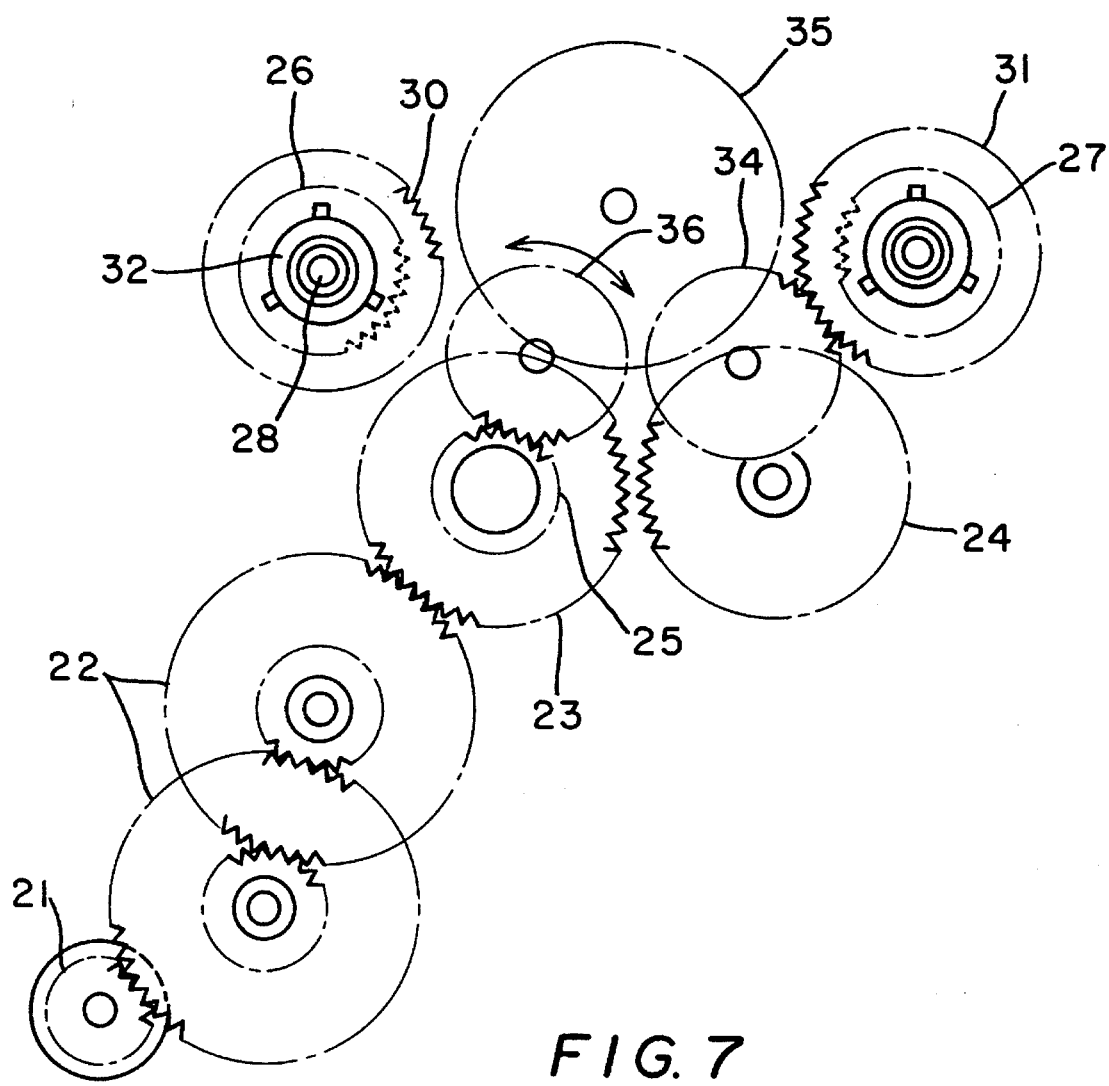
FIG. 7 is a plan view showing the neutral state for low-speed tape feeding.

Through switching action of the aforementioned low speed switching mechanism, which is not shown in the drawings, a pinch roller moves to and away from a capstan, and a head moves forward or rearward to or away from the position where it comes in contact with the tape, and through operation of the switching lever for directions of the tape feed, an automatic reverse mechanism or other similar mechanisms, small idler gear 36 moves in the directions indicated by the double-headed directional arrow in FIG. 7.

Next, the function of the present embodiment for the process of feeding a tape at a high speed is explained hereunder, referring to FIGS. 5 and 6.

When switching plate 40 slides from the neutral position shown in FIG. 5 to the right, for example, idler arm. 37 pivots clockwise, and as shown in FIG. 6, idler gear 35 attached to idler arm 37 by means of shaft 38 comes into engagement with first driving gear 23 and one of the small reel block gears, i.e. reel block gear 26. At that time, the head retreats from the position where it is in contact with the tape, and reel block 32 is rotated in the direction for fast-forward by means of an electric motor through reduction gear mechanism 22.

Then, when switching plate 40 slides in the opposite direction, to the left in this case, idler arm 37 returns to the position shown in FIG. 5.

When switching plate 40 slides further to the left, idler arm 37 pivots counterclockwise, and idler gear 35 attached to the arm by means of shaft 38 comes into engagement with second driving gear 24 and the other small reel block gear, i.e. reel block gear 27. At that time, as idler gear 35 has been separated from engagement with small reel block gear 26, the other reel block, i.e. reel block 33, performs rewinding driven by the electric motor, with the head at the retracted position away from contact with the tape.

While a tape is fed at a high speed as described above, the other small idler gear, i.e. idler gear 36, has been separated from engagement with large reel block gear 30 and fixed-shaft intermediate gear 34.

When the tip circle portion of a tooth of reel block gear 26 or reel block gear 27 abuts against that of idler gear 35, or when the tip circle portion of a tooth of driving gear 23 or 24 abuts against that of idler gear 35, rotation of driving gear 23 or 24 is transmitted to idler gear 35 with their tips in abutment against each other in the same manner as the aforementioned gear mechanism shown in FIG. 1. Then, when rotation of idler gear 35 moves a truncated tooth, the portion from the tip circle to the vicinity of the pitch circle of which is cut off, to the engaging position, the opposing teeth of the two gears do not come into contact, and pressing force of said teeth that are in abutment against each other works in the direction of rotation of the respective gears, i.e. idler gear 35 and driving gear 23 or 24, or reel block gear 26 or 27. The tip portions of the two teeth are consequently separated from each other. Thus, each truncated tooth with its tip portion from the tip circle to the vicinity of the pitch circle cut off in creases in actuality the space between teeth and permits smooth, normal engagement.

Next, the function of the present embodiment for the process of feeding a tape at a low speed is explained.

Figure 8:
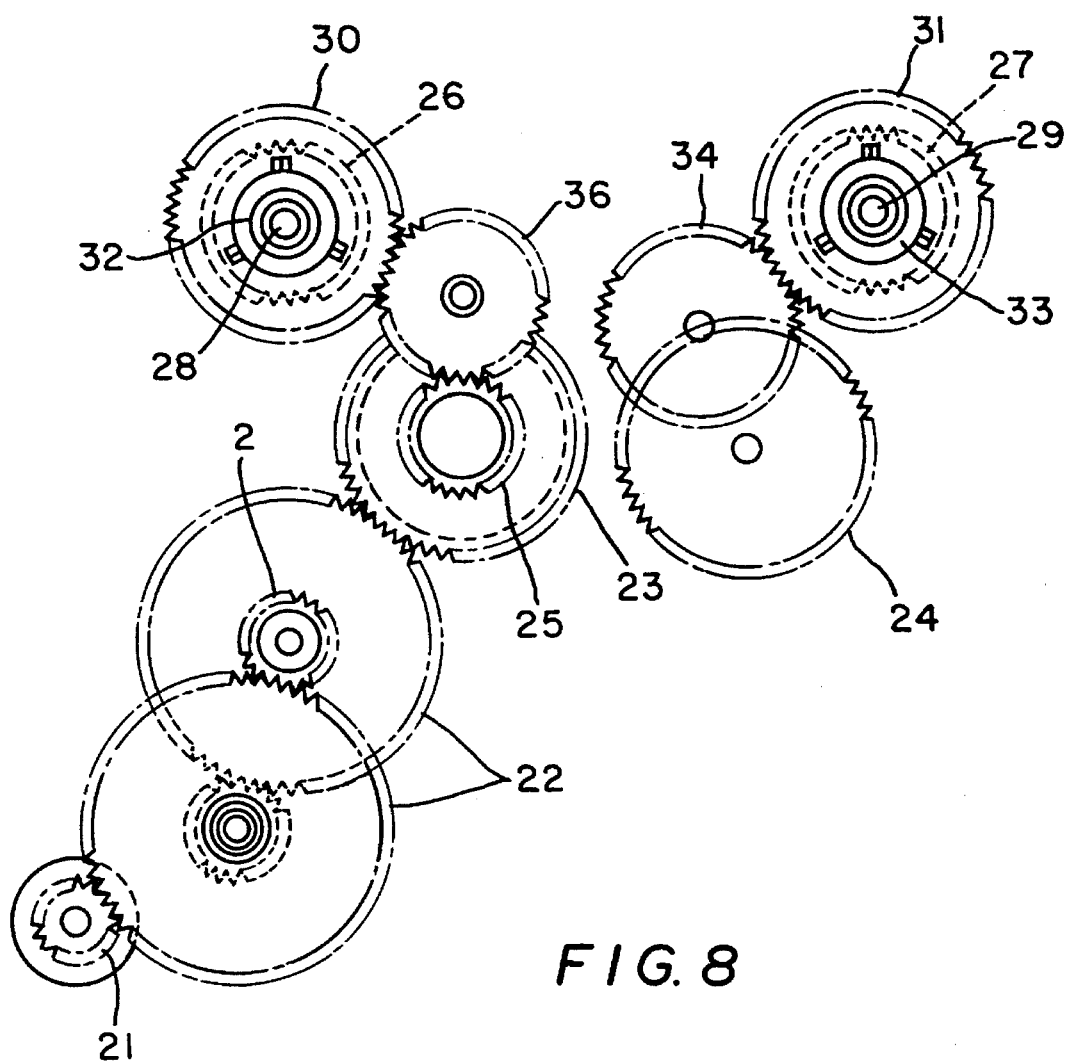
FIGS. 8 and 8A are plan views showing the engaged state thereof during low-speed tape feeding.
Figure 8A:
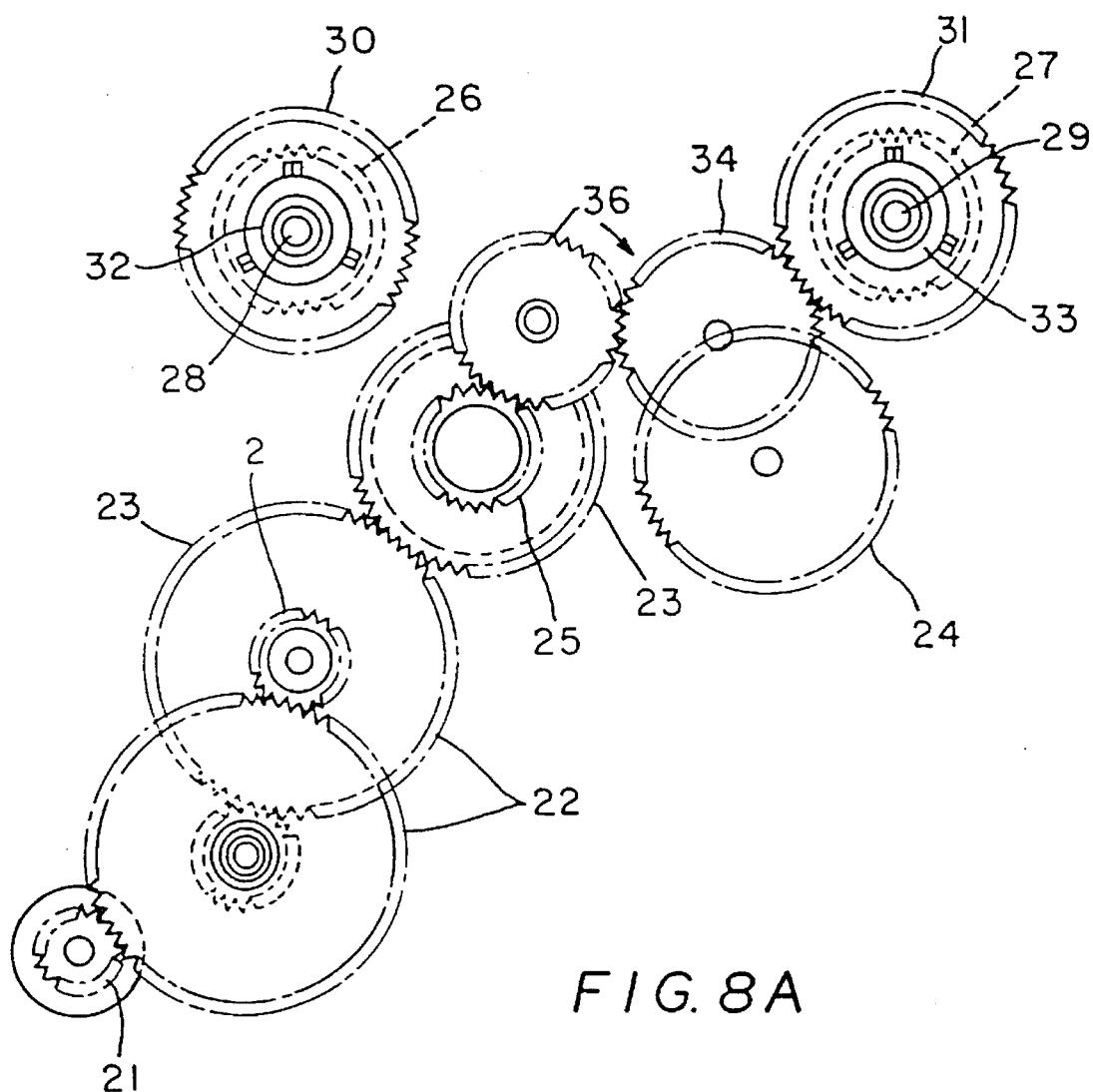
Figure 9:
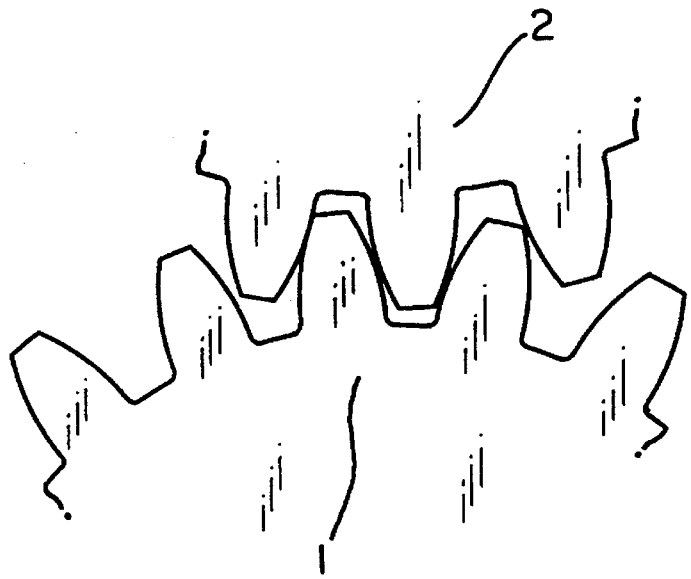
FIG. 9 is a plan view of a part of a conventional gear mechanism.
Figure 10:
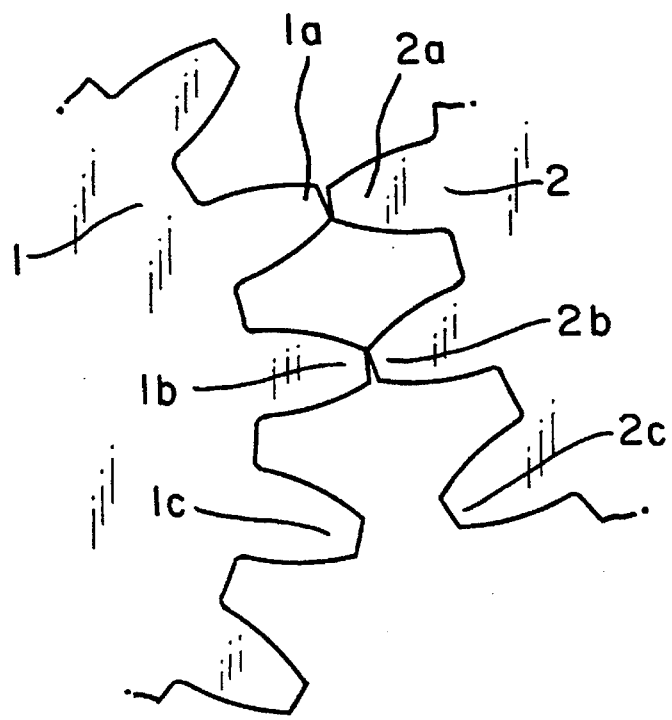
FIG. 10 is a plan view showing gear shifting action of the prior art of embodiment of FIG. 9.

As a result of insertion of a cassette which initiates the tape feed at a low speed, operation of the switching lever for directions of the tape feed, an automatic reverse mechanism or other similar mechanisms, small idler gear 36 shifts from the condition shown in FIG. 7 to that of FIG. 8, wherein it engages with third driving gear 25, which is coaxial with first driving gear 23, and large reel block gear 30. With the head held at the position where it is in contact with the tape, reel block 32 is rotated at a low speed by means of the electric motor through reduction gear mechanism 22, performing recording or replay of the tape.

Upon insertion of a cassette which initiates the tape feed at a low speed, operation of the switching lever for directions of the tape feed, an automatic reverse mechanism or other similar mechanisms causes small idler gear 36 to move in the opposite direction, it is separated from large reel block gear 30 and returned to the position shown in FIG. 7.

When small idler gear 36 moves further in the opposite direction, it comes into engagement with third driving gear 25 and fixed-shaft intermediate gear 34, and the other reel block, i.e. reel block 33, is rotated in the rewind direction by the electric motor through engagement of intermediate gear 34 with large reel block gear 31, with the head held in contact with the tape.

While a tape is fed at a low speed as described above, large idler gear 35 has been separated from engagement with each of small reel block gears 26/27 and driving gears 23/24, and second driving gear 24 has been separated from first driving gear 23.

During the engagement of idler gear 36 with reel block gear 30 and fixed-shaft intermediate gear 34 or with third driving gear 25, when the tip circle portions of teeth of engaged gears abut against each other, rotation of driving gear 25 is transmitted to idler gear 36 with the tips of said teeth in abutment against each other in the same manner as the gear mechanism shown in FIG. 1. Then, when rotation of idler gear 36 moves a truncated tooth, of which the portion from the tip circle to the vicinity of the pitch circle is cut off, to the engaging position, the opposing teeth of the two gears do not come into abutment, and pressing force of the said teeth that are in abutment against each other works in the direction of rotation of the respective gears, i.e. idler gear 36 and either driving gear 25, reel block gear 30 or fixed-shaft intermediate gear 34. The tips of the two teeth are consequently separated from contact. Thus, each truncated tooth of idler gear 36 with its tip portion from the tip circle to the approximate pitch circle cut off increases in actuality the space between teeth and permits smooth, normal engagement.

Although a truncated tooth with its portion from the tip circle to the vicinity of the pitch circle cut off is provided alternately with each uncut tooth of idler gears 35/36 in the configuration of the present embodiment, truncated teeth may be disposed in various intermittent manners without departing from the scope or spirit of the invention as defined in the appended claims. For example, truncated teeth having partially removed profile as above may be formed adjacent to each other at desired positions.

Furthermore, instead of providing idler gears 35/36 with truncated teeth, whose tip portions from the tip circle to the vicinity of the pitch circle are cut off, such truncated teeth may be formed on driving gears 23/24/25, reel block gears 26/27/30/31 and/or fixed-shaft intermediate gear 34 or on all of idler gears 35/36, driving gears 23/24/25, fixed-shaft intermediate gear 34 and reel block gears 26/27/30/31.

Although the above explanation referrers to embodiments which use involute gears, this invention is also applicable to other and various kinds of gear mechanisms.

The present invention provides a gear mechanism of a simple structure which reduces abutment of tooth tips when gears are engaged and, even if such abutment occurs, ensures that the gears return to their normal engaged position, thereby reducing occurrence of noise and/or malfunction as well as limitations on the design criteria and ensuring reliable engagement of gears.

According to another feature of the present invention, it is ensured that idler gears snugly engage with driving gears and reel block gears or with driving gears and an intermediate gear, and idler gears do not always have to be engaged with driving gears at first, but, instead, they may be engaged with reel block gears or a fixed-shaft intermediate gear before engaging with driving gears. Thus, the present invention is effective in reducing noises.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A gear mechanism comprising a fixed-shaft gear rotated at a fixed position and a movable gear which is movable toward and away from said fixed-shaft gear so as to be freely engaged with and separated therefrom, comprising:

a portion from a root circle to a tip circle of each tooth of said fixed-shaft gear and movable gear being formed of a constant curvature; and said fixed-shaft gear and said movable gear being selectively provided with truncated teeth intermittently placed with full-size teeth, each truncated tooth having a tip portion from the vicinity of a pitch circle to the tip circle cut off.

2. A tape player comprising:

a movably mounted idler gear which is selectively movable between a first reel block gear and an intermediate gear so as to freely engage with and separate from said first reel block gear and said intermediate gear, said first reel block gear and said intermediate gear being driven by shifting engagement of said movably mounted idler gear between a first and a second position;

a first and a second driving gear;

a second reel block gear;

a portion from a root circle to a tip circle of each tooth of said first and second driving gears, first and second reel block gears, said movably mounted idler gear, and said intermediate gear is formed of a constant curvature; and at least one of said driving gears of said first and second driving gears or reel block gears of said first and second reel block gears or said movably mounted idler gear or said intermediate gear is provided with truncated teeth intermittently dispersed among full-size teeth, each truncated tooth having a tip portion from a vicinity of a pitch circle to the tip circle cut off.

3. The tape player of claim 2, further comprising:

said intermediate gear having a fixed shaft positioned between said movably mounted idler gear and said second reel block gear so as to be able to engage with said second reel block gear;

said movably mounted idler gear positioned between said intermediate gear and said first reel block gear so as to be able to engage with said intermediate gear and said first reel block gear;

whereby directions of the tape feed are switched by shifting engagement of said movably mounted idler gear.

4. A tape player, comprising;

an idler arm mounted for pivotal movement between a first, a neutral, and a second position;

an idler arm idler gear rotatably mounted at a free end of said idler arm;

a first and a second driving gear, said second driving gear being movably mounted;

a first large reel block gear and a first small reel block gear coaxially mounted therewith;

a second large reel block gear and a second small reel-block gear coaxially mounted therewith;

a movably mounted idler gear;

a fixed shaft intermediate gear;

said first position of said idler arm causing said idler arm idler gear to meshingly engage said first small reel block gear and said first driving gear;

said first position of said idler arm causing said idler arm idler gear to meshingly engage said first driving gear;

said second position of said idler arm causing said movably mounted idler gear to meshingly engage said second small reel block gear and said second driving gear;

said second position of said idler arm causing said idler arm idler gear to disengage from said first driving gear;

whereby said first and second positions of said idler gear effect fast forwarding and rewinding, respectively, when said first and second driving gears are intermeshed with one another.

5. A tape player, comprising:

an idler arm mounted for pivotal movement between a first, a neutral, and a second position;

an idler arm idler gear rotatably mounted to a free end of said idler arm;

a first and a second driving gear, said second driving gear being movably mounted;

a third driving gear coaxially mounted and conjointly rotatable with said first driving gear;

a first large reel block gear and a first small reel block gear coaxially mounted therewith;

a second large reel block gear and a second small reel block gear coaxially mounted therewith;

a movably mounted idler gear;

a fixed shaft intermediate gear;

said first position of said idler arm causing said movably mounted idler gear to meshingly engage said third driving gear and said first large reel block gear;

said second position of said idler arm causing said movably mounted idler gear to meshingly engage said third driving gear and said fixed shaft intermediate gear;

said fixed shaft intermediate gear being intermeshed with said second large reel block gear;

whereby said first and second positions of said idler arm effect replay or recording and rewinding, respectively, when said first and second driving gears are disengaged from one another.

* * * * *